UNITED STATES PATENT OFFICE.

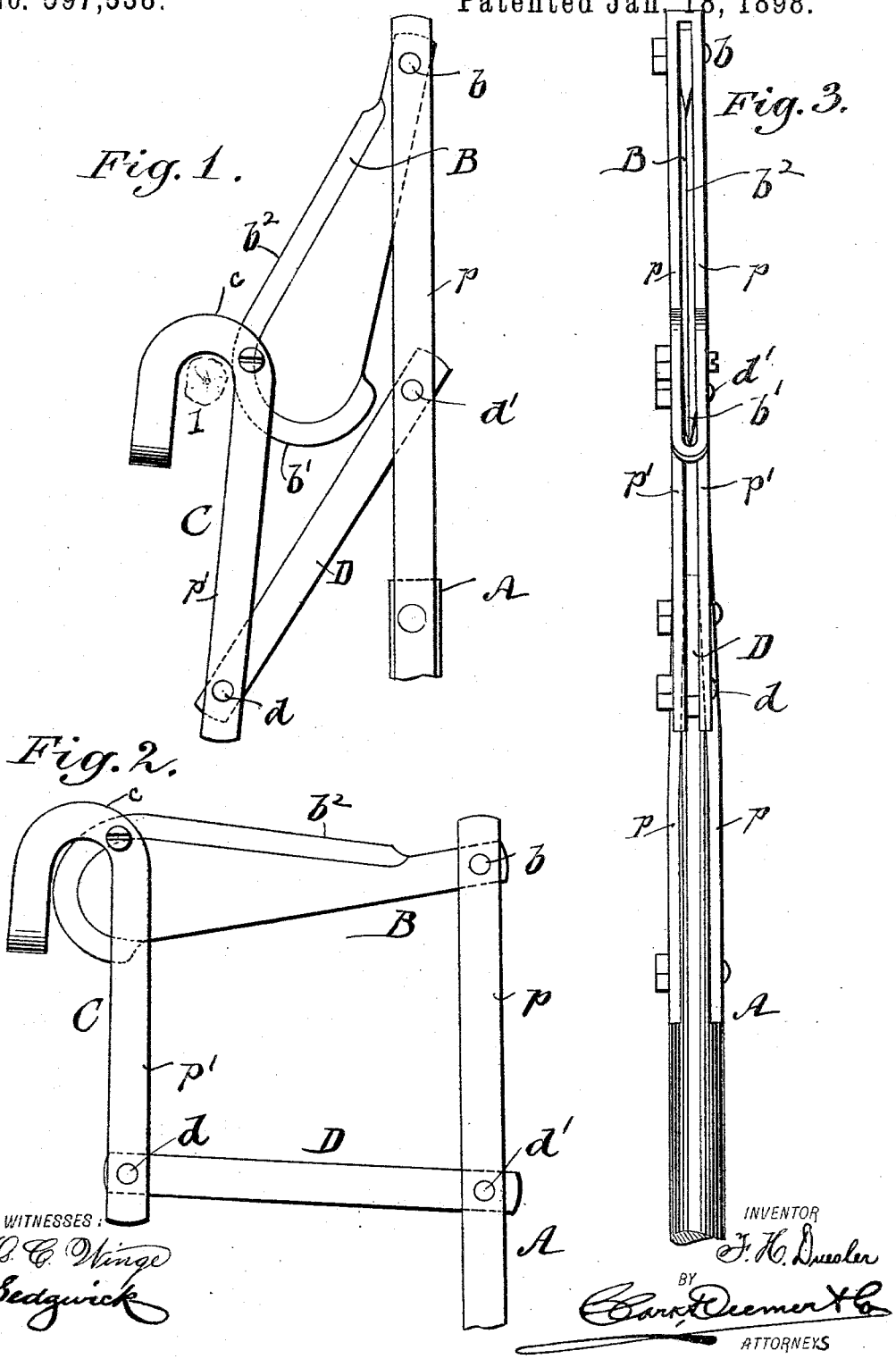

FRANCIS HENRY DUESLER, OF FONDA, NEW YORK.

PRUNING IMPLEMENT.

SPECIFICATION forming part of Letters Patent No. 597,538, dated January 18, 1898.

Application filed March 29, 1897. Serial No. 629,648. (No model.)

*To all whom it may concern:*

Be it known that I, FRANCIS HENRY DUESLER, a citizen of the United States, and a resident of Fonda, county of Montgomery, and State of New York, have invented certain new and useful Improvements in Pruning Implements, of which the following is a specification, reference being had to the accompanying drawings, forming a part thereof, in which similar letters of reference indicate corresponding parts.

This invention relates to pruning implements, and has for its object to provide a simple and improved device of this character which will possess advantages in point of convenience, ease of operation, effective leverage, power, adaptability, and general efficiency.

In the drawings, Figure 1 is a side elevation showing my improved pruning device in open position with relation to the limb of a tree. Fig. 2 is a corresponding view showing the same in its final position after the cutting is made. Fig. 3 is an edge view.

Referring to the drawings, A designates a handle, which may be of any suitable or desired length, to the top of which is pivoted, as at $b$, a laterally-projecting cutting-blade B, having a segmental or curved outer cutting edge $b'$ and a top cutting edge $b^2$.

C designates a hook which is adapted to be engaged over the limb (shown at $l$) of a tree.

The outer portion of the cutting-blade B is pivotally connected with the hook-shaped top end $c$ of the hook member C, so that the segmental end cutting edge of the blade operates within said hook-shaped end and toward the front thereof, as shown, the pivotal connection between the hook member and blade being preferably at the inner side of the hook-shaped top end and near the top or outer edge of the blade at the point just above the segmental or curved end of the cutting edge.

The bottom end of the hook member C is connected by a connecting bar or cross-piece D with the handle A at a suitable point below the pivotal connection of the cutting-blade, said connecting link or bar D having its outer end pivoted, as at $d$, to the bottom end of the hook member, and its inner end pivoted, as at $d'$, to the handle member A.

In the practical construction of my improved pruning implement I prefer to form the extended top portion of the handle member of two parallel metallic plates $p$ $p$, between which the blade and connecting-link D are pivoted, and the hook-shaped member is also preferably formed of two parallel plates $p'$ $p'$, extending throughout its length, between the bottom ends of which the connecting-bar D is pivoted and between which at the hook-shaped top portion the segmental or curved front cutting edge of the blade is pivoted or works.

The operation and advantages of my invention will be readily understood. When the hook-shaped member is swung down with relation to the handle member upon its pivotal connections with the cutting-blade and the connecting link or bar D, the parts will be in the open position shown in Fig. 1. The hook-shaped top end may then be engaged over the limb $l$ of a tree, when by simply pulling down upon the handle a strong leverage is secured by means of the pivotal connections between the then stationary hook member and the handle, in which downward movement the segmental or curved front cutting edge of the blade is forced inwardly and upwardly with respect to the hook-shaped top end of the hook member until the parts assume the position shown in Fig. 2, during which operation the limb of the tree will be effectively and quickly cut.

The top cutting edge upon the pivotal connecting-blade is adapted to be used in cutting sprouts, &c.

Having thus described my invention, what I claim as new, and desire to secure by Letters Patent, is—

1. An improved pruning implement, comprising a handle, an outer member having a hook-shaped top end, a cutting-blade pivoted at its inner end to the top of the handle and pivotally connected at its outer end to the inner portion of the hook-shaped top of the outer member, said cutting-blade having a segmental or curved cutting edge adapted to operate inwardly and upwardly with relation to said hook and a straight cutting edge upon the top adapted to operate vertically and a connecting rod or link pivotally mounted and extending from the lower end of the outer member to the handle, substantially as and for the purpose set forth.

2. An improved pruning implement, comprising a handle, an outer member having a hook-shaped top end, a cutting-blade having a top cutting edge and a segmental or curved outer or cutting end, said blade being pivoted at its inner end to the handle and being pivotally connected at its outer end at a point above and in rear of the segmental curved cutting edge to the inner portion of the hook-shaped top end, whereby said blade is adapted to move inwardly and upwardly with respect to said hook as well as vertically with respect to the handle, and a connecting link or bar having its outer end pivoted to the lower end of the hook member and its inner end pivoted to the handle at a point opposite, substantially as and for the purpose set forth.

3. An improved pruning implement, comprising a handle, an outer member pivotally mounted with relation to the handle and having a hook-shaped top end, said outer member embodying side plates, a cutting-blade provided with the outer and the top cutting edge and having its inner end pivoted to the handle and its outer end pivotally mounted between the side plates of the hook, and a pivotally-mounted connecting-link extending between the hook member and the handle, substantially as and for the purpose set forth.

In testimony that I claim the foregoing as my invention I have signed my name, in presence of two witnesses, this 26th day of March, 1897.

FRANCIS HENRY DUESLER.

Witnesses:
FRANCIS H. DUESLER,
WILLIAM BERRY.